United States Patent [19]
Eilemann et al.

[11] Patent Number: 5,967,598
[45] Date of Patent: Oct. 19, 1999

[54] INSTRUMENT PANEL FOR A MOTOR VEHICLE

[75] Inventors: Andreas Eilemann, Korntal-Muenchingen; Dietrich Klingler, Heubach, both of Germany

[73] Assignee: Behr GmbH & Co., Stuttgart, Germany

[21] Appl. No.: 08/862,312

[22] Filed: May 23, 1997

[30] Foreign Application Priority Data

May 24, 1996 [DE] Germany ............... 196 20 921

[51] Int. Cl.⁶ .................................. B62D 25/14
[52] U.S. Cl. ............... 296/208; 296/39.3; 296/70; 180/90
[58] Field of Search ............. 296/70, 39.3, 208; 180/90

[56] References Cited

U.S. PATENT DOCUMENTS

| | | | |
|---|---|---|---|
| 4,391,465 | 7/1983 | Piano | 296/208 |
| 4,668,004 | 5/1987 | Tsunoda et al. | 296/70 |
| 4,733,739 | 3/1988 | Lorenz et al. | 180/90 |
| 4,882,002 | 11/1989 | Ando et al. | 296/70 X |
| 5,094,318 | 3/1992 | Maeda et al. | 296/39.3 X |

FOREIGN PATENT DOCUMENTS

| | | |
|---|---|---|
| 0 185 856 | 7/1986 | European Pat. Off. . |
| 0 713 798 A1 | 5/1996 | European Pat. Off. . |
| 2 696 382 | 4/1994 | France . |
| 78 05 175 | 6/1978 | Germany . |
| 31 19 572 C2 | 3/1982 | Germany . |
| 34 47 185 C2 | 6/1986 | Germany . |
| 35 36 379 C2 | 4/1987 | Germany . |
| 44 23 108 A1 | 1/1995 | Germany . |
| 195 35 263 A1 | 4/1996 | Germany . |
| 0230831 | 12/1984 | Japan ............... 180/90 |
| 406092190 | 4/1994 | Japan ............... 296/70 |

*Primary Examiner*—D. Glenn Dayoan
*Assistant Examiner*—Jason Morrow
*Attorney, Agent, or Firm*—Foley & Lardner

[57] ABSTRACT

An instrument panel for a motor vehicle comprises a plurality of layers which have voided areas. The plurality of layers are fitted together to construct an instrument panel so that the voided areas cooperate to form one or more air ducts that can extend in three-dimensions.

8 Claims, 3 Drawing Sheets

INSTRUMENT PANEL FOR A MOTOR VEHICLE

BACKGROUND OF THE INVENTION

European Patent 0 185 856 B$_1$ discloses a known instrument panel formed by two panel parts each having walls forming a duct. The duct connects components of the ventilation and heating system, such as connections between a heating or air-conditioning system and the corresponding outlet nozzles. A disadvantage of known instrument panels is that the ducts are formed by thin, essentially vertical walls extending from the panel parts. The panel parts have to be accurately shaped so that the corresponding contact surfaces of the panel parts rest flush against one another. Furthermore, additional assembly is required to insert the individual components of the heating and ventilation system in specifically provided cutouts.

SUMMARY OF THE INVENTION

An object of the present invention is to provide an instrument panel with air ducts that are formed by the instrument panel in a simple manner and in any desired shape.

In accomplishing the foregoing and other objects of the invention, there has been provided an instrument panel for a motor vehicle, the instrument panel comprising: an upper panel defining an exterior surface of the instrument panel; a plurality of layers of sound-damping material positioned below said upper panel including a first layer and a second layer of sound-damping material located adjacent one another, said first and second layers of sound-damping material each including at least one voided area that cooperates with each other to define at least one duct.

Further objects, features and advantages of the present invention will be apparent from the detailed description of preferred embodiments that follows, when considered with the accompanying figures of drawing.

DETAILED DESCRIPTION OF THE PREFERRED EMBODIMENTS

According to the present invention, the instrument panel comprises layers of a sound-damping material. The sound-damping layers have recesses and/or openings forming air ducts of any desired shape or any desired cross section. Providing a plurality of such sound-damping layers makes it possible to form a plurality of air ducts arranged one above another and extending in different directions. Sound produced during operation of a heating or air-conditioning system is effectively damped because the instrument panel is preferably completely filled with the sound-damping layers. The layered arrangement of the sound-damping layers also enables the air ducts to extend in any desired direction. Routing additional air-conducting connections within the instrument panel is not necessary. Since the instrument panel is essentially completely filled with the sound-absorbing material, except for the air ducts, increased dimensional stability of the instrument panel is also achieved.

The sound-damping layers can be shaped foamed parts which are fastened, preferably removably, to an upper panel part. The sound-damping layers are preferably made of a flexible, open-pore foamed material.

According to one aspect of the invention, the panel parts and/or sound-damping layers are made of a foamed plastic. In particular, an expanded polypropylene material is a tough, elastic, yet sufficiently rigid foamed material providing increased transverse and longitudinal rigidity to the instrument panel.

The present invention permits the assembly of a compact heating or air-conditioning system for an instrument panel having an air duct. Only the openings of the outlet nozzle from the heating or air-conditioning system and the inlet openings to the instrument panel have to correspond to one another. Additionally, a heating or air-conditioning system is readily integrated with an instrument panel having air-conducting ducts. Only the outlet nozzle elements need to be adapted to the outlet openings.

Figure 1:
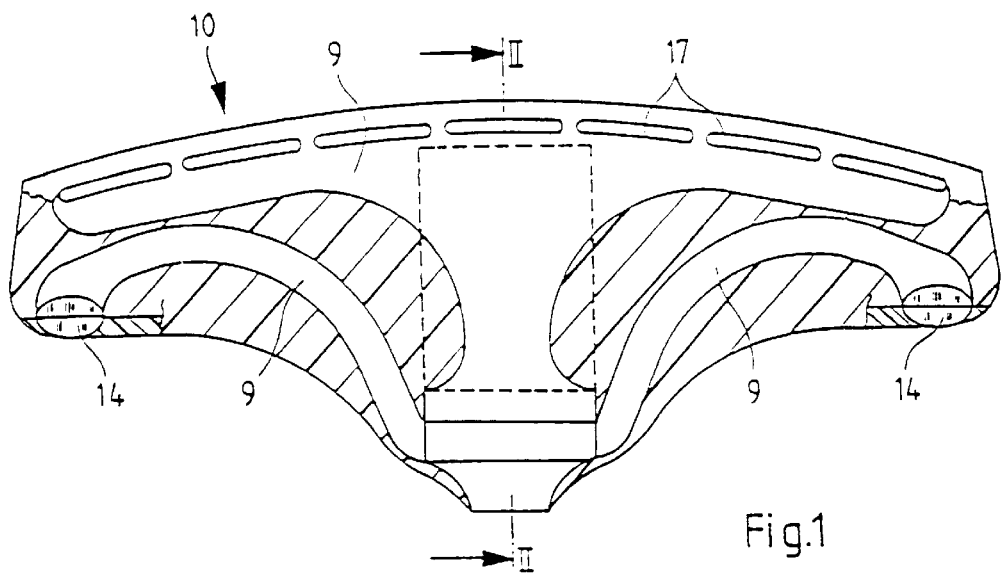
FIG. 1 is a perspective illustration of an instrument panel according to the present invention.
Figure 2:
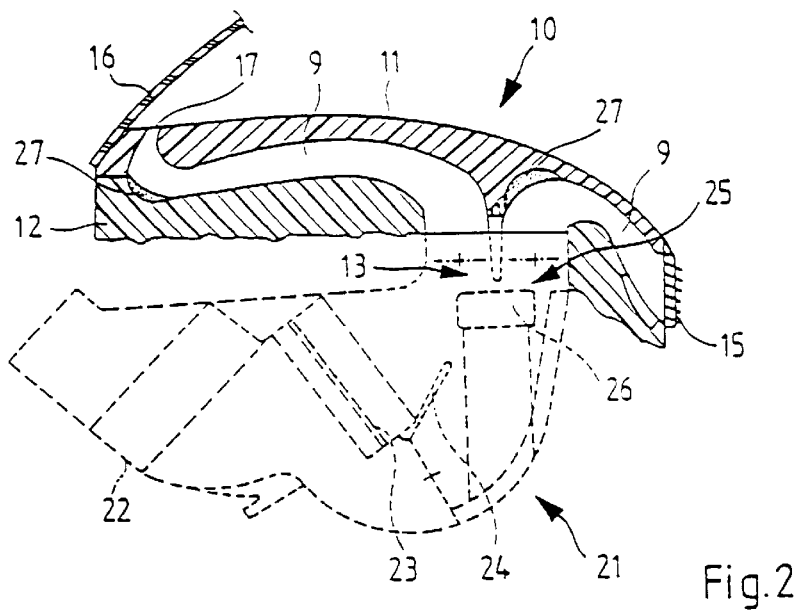
FIG. 2 shows a cross-section along the line II—II through the instrument panel according to FIG. 1.
Figure 3:
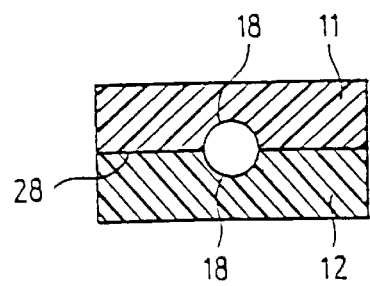
FIG. 3 shows a partial cross-section of the instrument panel in the region of an air duct.

Turning now to the drawings, FIGS. 1 and 2 show an instrument panel 10 in which a plurality of air-conditioning ducts are arranged. The instrument panel 10 comprises an upper panel part 11 and a lower panel part 12. Panel parts 11, 12 are made of a foamed plastic, preferably an expanded polypropylene (EPP). The panel parts 11 and 12 are shaped in such a way as to form air ducts 9 when the panel parts 11 and 12 are fitted together. Air ducts 9 run from an inlet region 13 of the instrument panel 10, located on an underside of the lower panel part 12, toward a laterally arranged side nozzle outlet opening 14, a forwardly extending central nozzle outlet opening 15 and a plurality of defroster outlet openings 17 arranged in the region of a windshield 16. Panel parts 11 and 12 have trough-shaped depressions 18 (FIG. 3) which cooperatively form air duct 9. Air duct 9 extends with a cross section of approximately equal size to the side nozzle outlet openings 14 and to the central nozzle outlet opening 15. The air duct 9 to the defroster outlet opening 17 has an essentially concave shape in the longitudinal direction, and the cross section of duct 9 narrows in the region of the defroster nozzle outlet opening 17.

Below the inlet region 13, an air-conditioning system 21 is fixed to the instrument panel 10. The air-conditioning system 21 is designed in a manner known per se and has a condenser 22 and a heating element 23. The temperature of the air flow through the outlet openings 25 of the air-conditioning system 21 is adjusted by a mixer flap 24. An outlet nozzle 26 provides air flow in the direction of the foot compartment outlet nozzles (not shown).

Depending on the dimensions of the instrument panel 10, the panel parts 11 and 12 can be produced as injection moldings. The two parts 11 and 12 are fixed together by bonding at the contact surfaces 28. Because the instrument panel 10 is almost completely filled with a foamed plastic—except for air ducts 9 or any other ducts for electric cables—a compact unit which also provides sound-damping is provided. To increase the sound-damping, damping zones 27 are preferably arranged at bends in the air ducts 9. These may be made of a sound-damping material and installed after production of the individual panel parts 11 and 12. Subsequently, the panel parts 11 and 12 are joined together to form the instrument panel 10.

The panel parts 11 and 12 may be shaped in such a way that a transverse cross-member (not illustrated) can be embedded as a core during the extrusion process, thus ensuring sufficient transverse rigidity of the vehicle.

Figure 4:
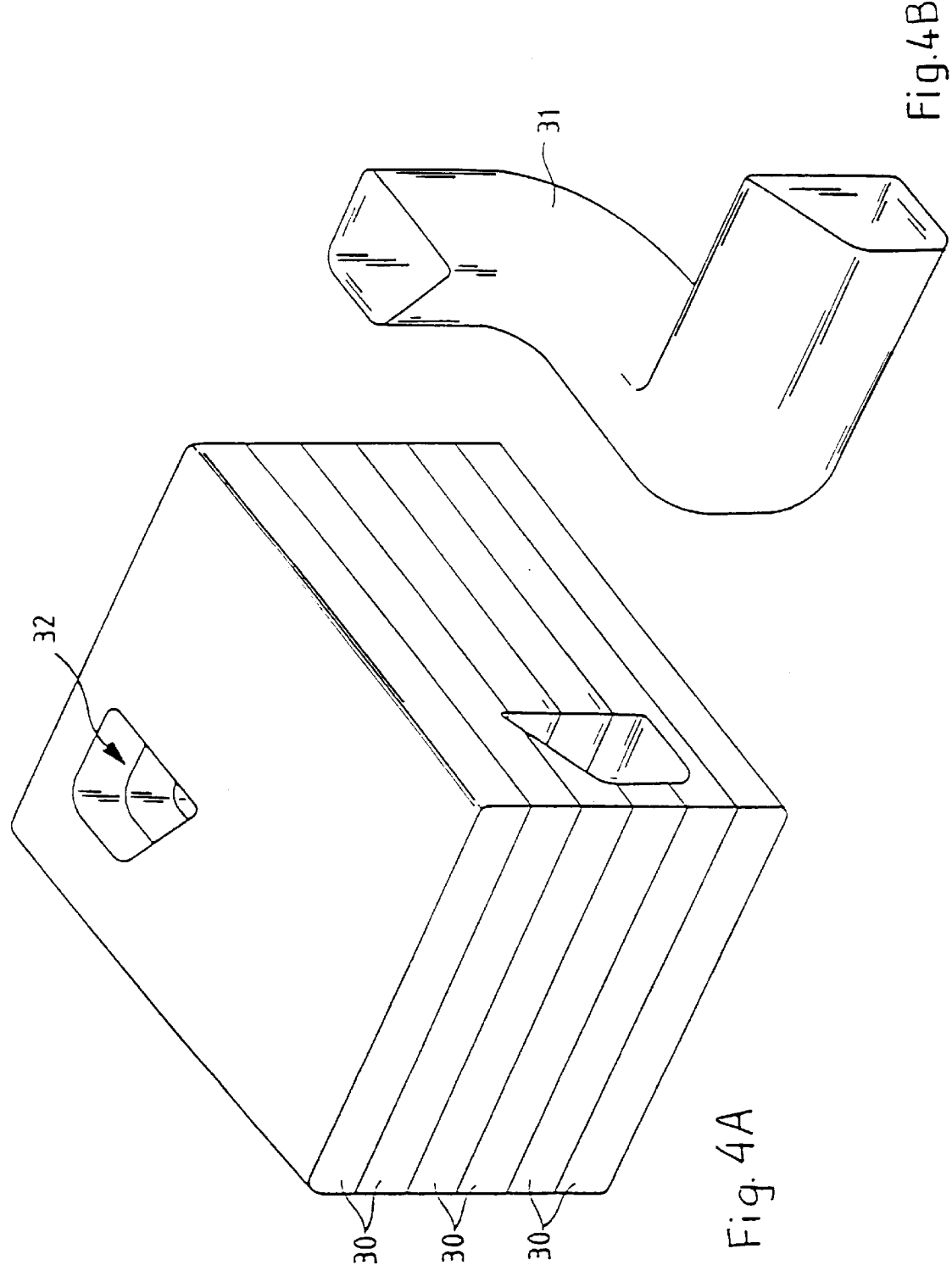
FIGS. 4A and 4B are perspective illustrations of a block of a plurality of sound-damping layers which is fastened to an upper panel part, and the shape of an air duct running through the block, respectively.

According to a further embodiment of the invention (FIGS. 4 and 5), the interior of the instrument panel 1 is filled with a plurality of horizontal layers 30 made of a sound-damping material. The sound-damping layers 30 are relatively thin and have readily formed features. When a number of sound-damping layers 30 are stacked on one another, a complex air duct 31 is formed which is not limited to conducting continuous air flow in a single plane. According to the present invention, a continuous flow of air in any desired path can be provided.

Figure 5:
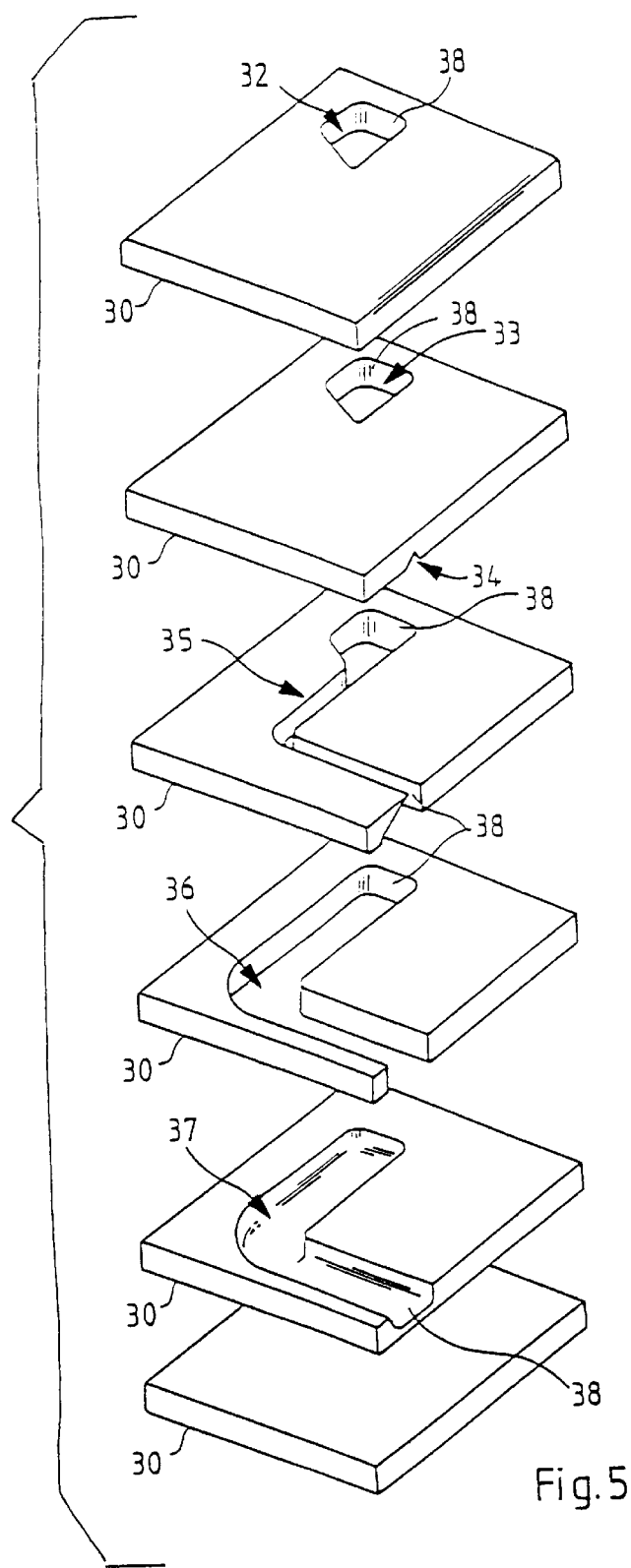
FIG. 5 is an exploded view of the plurality of sound-damping layers constituting the block according to FIG. 4A.

As shown by way of example in FIGS. 4A, 4B and 5, the air duct 31 may run in a three-dimensional configuration from a top corner of the uppermost sound-damping layer 30 in a smooth downward curve, bend 90°, and continue parallel to the sound-damping layers 30 to a side outlet. The two uppermost sound-damping layers 30 have holes 32 and 33, respectively. The sound-damping layers 30 are stacked one above the other aligning the holes 32 and 33. The holes 32 and 33 have the shape of a sector of a circle. The sound-damping layer 30 second from the top has, on its underside, a wedge-shaped recess 34, the course of which corresponds to a cutout 35 in the adjacent sound-damping layer 30 immediately therebelow. The cutout 35 widens in cross section in a wedge shape towards the bottom and has the same course as a cutout 36 in the sound-damping layer 30 immediately therebelow. A further sound-damping layer 30 has a recess 37, so that, after the sound-damping layers 30 have been fitted together, the air duct 31 illustrated in FIG. 4B is formed.

By layering a number of sound-damping layers 30 on one another, an air duct 31 is thus formed, which may run in any desired direction, with a continuous course, depending on the requirements. The layers merely need to be provided with appropriate impressions or punchings to form the holes 32,33, recesses 34,37 and cutouts 35,36. The sound-damping layers 30 are made of a sound-damping material, preferably an open-pore foamed material. This may be configured as a foamed plastic, such as PE foam or PU foam. The sound-damping layers 30 are placed one above another and are held together laterally by suitable fastening means. They are subsequently fastened to the underside of the upper instrument panel 11. Since the air ducts are formed by the sound-damping layers 30, attaching the lower panel part 12 is not required. The instrument panel 10 is thus formed by the upper panel part 11 and the underlying sound-damping layers 30.

The sound-damping layers 30 may also be made of a different material, to target a specific sound frequency to be damped. Appropriate materials of different sound-absorbing properties are arranged within the layered structure of the sound-damping layers 30 depending on the site of the sound source or the course of the sound. Increasing the number of sound-damping layers 30 increases the continuity or uniformity of the air flow by eliminating any sharp edges which lead to eddying, and further reduces the noise created in the air flow. Furthermore, a multi-layer arrangement of the sound-damping layers 30 permits air ducts to run in any desired direction. For example, several air ducts may cross over/under one another. This permits a space-saving construction of the instrument panel.

To combat bacteria, the holes 32,33, the recesses 34,37 and the cutouts 35,36 have a thin membrane coating 38 which is applied in each case after the individual sound-damping layers 30 have been produced. The membrane coating 38 preferably consists of a so-called non-woven material.

The entire disclosure of German patent application No. 196 20 921.8 is hereby incorporated by reference.

While the invention has been described and disclosed with reference to certain preferred embodiments, it is to be understood that various modifications to the embodiments are possible. Thus, the full scope of the invention is to be determined with reference to the attached claims.

What is claimed is:

1. An instrument panel for a motor vehicle, the instrument panel comprising:

an upper panel defining an exterior surface of the instrument panel; and a plurality of layers of sound-damping material positioned below said upper panel, said plurality of layers including a first layer and a second layer of sound-damping material located adjacent one another, and at least one additional layer of sound-damping material contiguously stacked with said first and second layers, wherein said first layer, said second layer, and said at least one additional layer of sound-damping material each including at least one voided area that cooperate with each other to define at least one duct, and wherein said first layer, said second layer, and said at least one additional layer comprise open-pore foamed shaped parts.

2. An instrument panel according to claim 1, wherein said voided areas are selected from a hole, a recess and a cut-out.

3. An instrument panel according to claim 1, wherein said first layer, said second layer and said at least one additional layer are detachably connected to said upper panel.

4. An instrument panel according to claim 1, wherein said at least one duct defines a three-dimensional pathway.

5. The instrument panel according to claim 1, wherein said at least one duct has a configuration sufficient to maintain fluid flow at a substantially constant pressure.

6. An instrument panel for a motor vehicle, the instrument panel comprising:

an upper panel defining an exterior surface of the instrument panel; and a plurality of layers of sound-damping material positioned below said upper panel, said plurality of layers including a first layer and a second layer of sound-damping material located adjacent one another, and at least one additional layer of sound-damping material contiguously stacked with said first and second layers, wherein said first layer, said second layer, and said at least one additional layer of sound-damping material each including at least one voided area that cooperate with each other to define at least one duct, and wherein said first layer, said second layer, and said at least one additional layer comprise an expanded polypropylene.

7. An instrument panel according to claim 1, further comprising groups of said first layer, said second layer, and said at least one additional layer forming a plurality of ducts.

8. An instrument panel according to claim 1, further including a bacteria resistant coating on said voided areas.

* * * * *